(12) United States Patent
Tran et al.

(10) Patent No.: US 12,283,015 B2
(45) Date of Patent: Apr. 22, 2025

(54) VIRTUAL ENVIRONMENT ASSET LOCATION ASSIGNMENT

(71) Applicant: THE WEATHER COMPANY, LLC, Brookhaven, GA (US)

(72) Inventors: Thai Quoc Tran, San Jose, CA (US); Cindy Han Lu, San Jose, CA (US); Weiwei Liu, Irvine, CA (US)

(73) Assignee: THE WEATHER COMPANY, LLC, Brookhaven, GA (US)

( * ) Notice: Subject to any disclaimer, the term of this patent is extended or adjusted under 35 U.S.C. 154(b) by 136 days.

(21) Appl. No.: 17/026,246

(22) Filed: Sep. 20, 2020

(65) Prior Publication Data
US 2022/0091965 A1    Mar. 24, 2022

(51) Int. Cl.
| | |
|---|---|
| G06T 19/20 | (2011.01) |
| G06F 11/3698 | (2025.01) |
| G06F 30/20 | (2020.01) |
| G06F 111/18 | (2020.01) |
| G06T 15/06 | (2011.01) |

(52) U.S. Cl.
CPC .......... *G06T 19/20* (2013.01); *G06F 11/3698* (2025.01); *G06F 30/20* (2020.01); *G06T 15/06* (2013.01); *G06F 2111/18* (2020.01); *G06T 2210/61* (2013.01)

(58) Field of Classification Search
None
See application file for complete search history.

(56) References Cited

U.S. PATENT DOCUMENTS

| | | | |
|---|---|---|---|
| 6,765,574 B1 * | 7/2004 | Mao ...................... | G06T 17/005 345/428 |
| 6,903,741 B2 | 6/2005 | Corbetta | |
| 10,046,241 B1 | 8/2018 | Krosky et al. | |
| 2006/0149516 A1 * | 7/2006 | Bond ...................... | G06F 30/15 703/6 |
| 2007/0206005 A1 * | 9/2007 | Phelps .................... | G06T 19/00 345/420 |
| 2009/0144137 A1 * | 6/2009 | Moulton ............ | G06Q 30/0601 705/26.1 |
| 2010/0161295 A1 * | 6/2010 | Heil ....................... | G09B 9/301 703/8 |
| 2012/0231425 A1 | 9/2012 | Calman et al. | |
| 2017/0046882 A1 | 2/2017 | Lane et al. | |
| 2020/0302689 A1 * | 9/2020 | Li ........................... | G06T 17/20 |

FOREIGN PATENT DOCUMENTS

| | | |
|---|---|---|
| CN | 107362536 A | 11/2017 |
| EP | 1073016 B1 | 11/2007 |

OTHER PUBLICATIONS

David Foldes, Bedrich Beneŝ, "Occlusion-Based Snow Accumulation Simulation", 2007, Eurographics, Proceedings of 4th Workshop in Virtual Reality Interactions and Physical Simulation "VRIPHYS" (2007).*

(Continued)

*Primary Examiner* — Robert Bader
(74) *Attorney, Agent, or Firm* — Barnes & Thornburg LLP

(57) ABSTRACT

Assets in a virtual environment are assigned to locations based on attributes of the locations, such as light level, temperature, etc. Attributes are determined based on simulating the virtual environment. The virtual environment can be simulated over a period of time, during which multiple attribute values can be recorded, resulting in an aggregated attribute value to better enable more immersive asset placement.

14 Claims, 8 Drawing Sheets

(56) References Cited

OTHER PUBLICATIONS

Stefan Bornhofen, Claude Lattaud, "Competition and evolution in virtual plant communities: a new modeling approach", Jun. 2009, Natural Computing: an international journal, vol. 8, Issue 2, pp. 349-385.*

M Chelle, B Andrieu, "Modelling the Light Environment of Virtual Crop Canopies", 2007, Springer, Functional-Structural Plant Modelling in Crop Production.*

Eugene Ch'ng, "Modelling the Adaptability of Biological Systems", 2007, Bentham Science Publishers Ltd., The Open Cybernetics & Systemics Journal, vol. 1, pp. 13-20.*

Ch'ng, "Realistic Placement of Plants for Virtual Environments," IEEE Computer Society, Jul./Aug. 2011, 12 pages.

McLendon, "How to Make a Sun Map of Your Garden," Treehugger.com, Updated Jun. 14, 2017, 17 pages, https://www.treehugger.com/how-make-sun-map-your-garden-4868783.

"Vegetation Studio," Awesome Technologies, 2017, 12 pages, https://www.awesometech.no/index.php/home/vegetation-studio/.

"Trees set on "few" =vegetation overgrown?!," Comment by ThemInspectors in Thread, Klei Entertainment Forums, Jul. 22, 2017, 10 pages, https://forums.kleientertainment.com/forums/topic/80765-trees-set-on-few-vegetation-overgrown/?do-findComment&comment=945591.

"Light," Official MineCraft Wiki, Printed Sep. 17, 2020, 11 pages, https://minecraft.gamepedia.com/Light.

* cited by examiner

VIRTUAL ENVIRONMENT ASSET LOCATION ASSIGNMENT

BACKGROUND

Virtual environments are a key part of several industries, such as video games and animated films. They are typically designed by developers with a particular goal or theme in mind, and can vary wildly in level of detail, size, setting, etc. A virtual environment may be created by forming a basic topology (shaping terrain), then adding a variety of assets such as plants, boulders, structures, etc.

SUMMARY

Some embodiments of the present disclosure can be illustrated as a method. The method comprises receiving a virtual environment with a location, wherein the location has an attribute. The method further comprises simulating the virtual environment over a duration. The method further comprises recording (based on the simulating over the duration) a first set of attribute values, the first set of attribute values including a first attribute value describing the attribute at the location at a first time during the duration and a second attribute value describing the attribute at the location at a second time during the duration. The method further comprises determining an aggregate attribute value based on the first set of attribute values, the aggregate attribute value describing the attribute at the location over the duration. The method further comprises receiving an attribute range for an asset. The method further comprises detecting that the aggregate attribute value is within the attribute range. The method further comprises determining (based on the detecting) to assign the first asset to the first candidate location.

Some embodiments of the present disclosure can also be illustrated as a computer program product comprising a computer readable storage medium having program instructions embodied therewith, the program instructions executable by a computer to cause the computer to perform any of the methods discussed above.

Some embodiments of the present disclosure can be illustrated as a system. The system may comprise memory and a central processing unit (CPU). The CPU may be configured to execute instructions to perform any of the methods discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
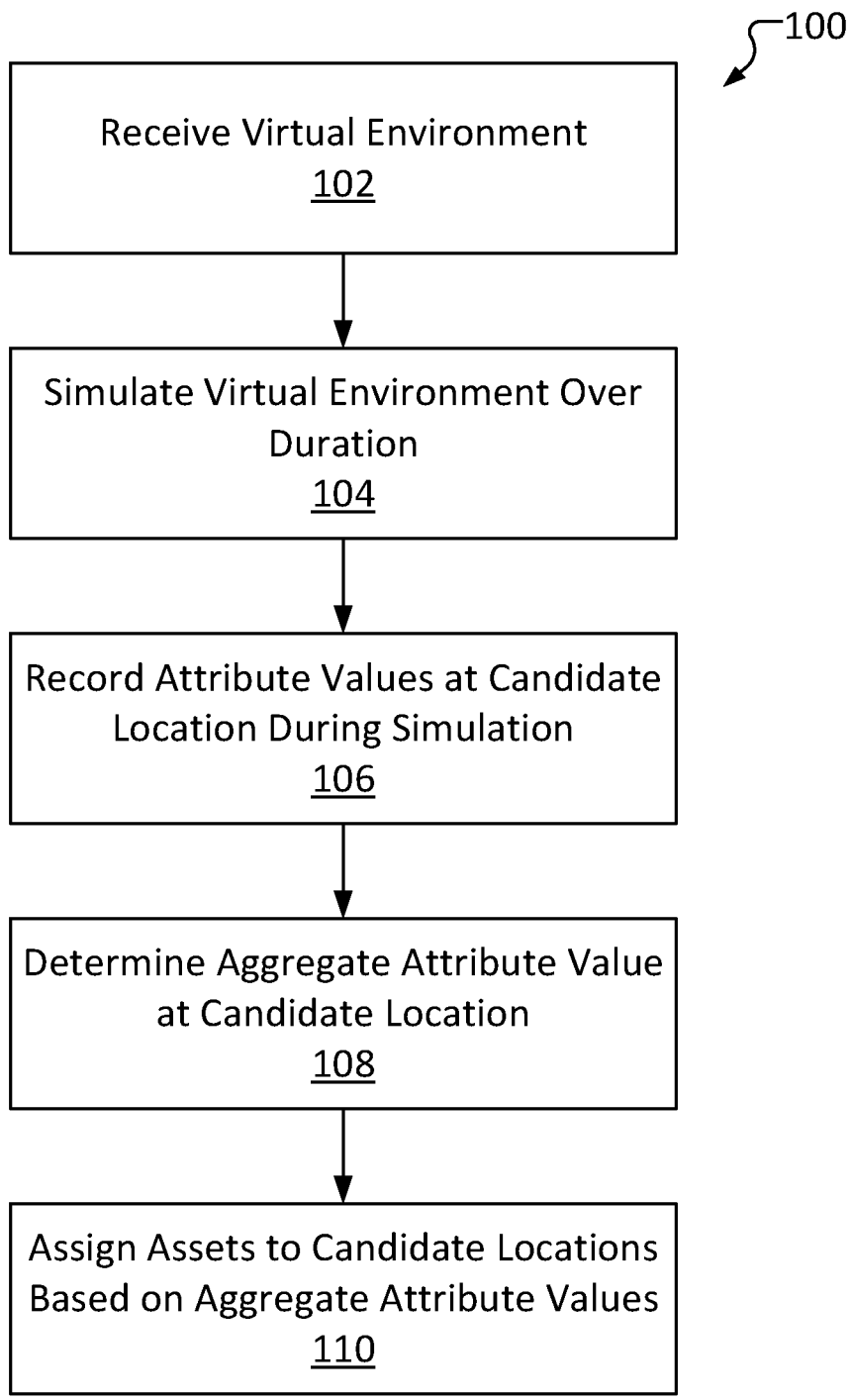
FIG. 1 is a high-level simulation-based asset location assignment method, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described herein. On the contrary, the intention is to cover all modifications, equivalents, and alternatives falling within the spirit and scope of the invention.

DETAILED DESCRIPTION

Aspects of the present disclosure relate to systems and methods to spawn virtual assets in a virtual environment based on simulating the virtual environment. More particular aspects relate to a system to receive a virtual environment, simulate a subsystem within the virtual environment, generate an attribute map, and assign an asset to a location in the environment based on the attribute map.

Placement of assets within virtual environments is often a time-intensive process, particularly when the placement can change in response to modification of one or more parameters of those virtual environments. Extra effort is often required to place assets in a realistic manner.

The methods and systems consistent with the present disclosure enable automated asset placement within a virtual environment based on simulation of the environment (such as by simulating one or more subsystems within the environment). This advantageously improves development time and flexibility of virtual environments.

Throughout this disclosure, reference is made to "attributes," "assets," and "locations." As used herein, an "attribute" refers to a property such as light, temperature, foot traffic, humidity, etc. "Attribute values" are specific values that quantitatively express a given attribute at a given point in time. For example, "temperature" is an attribute, while "25 degrees Celsius" is an attribute value. An "asset" is an object within a virtual environment. Examples of "assets" include buildings, rocks, plants, etc. In some embodiments, assets may be placed on other assets. For example, a first asset may be a tree, a second asset may be a healthy leaf, and a third asset may be a wilted leaf. The second and third assets may be assigned to locations on the first asset depending upon aggregate attribute values. Thus, depending upon aggregate attribute values, the tree may have healthy leaves or wilted leaves (or no leaves). In some embodiments, a first asset may be a tree with healthy leaves, a second asset may be a tree with wilted leaves, and a third asset may be a tree with no leaves.

Locations within a virtual environment may be defined by a coordinate grid or space. For example, a virtual environment may have a baseline/minimum unit of distance (often simply referred to as "units"), and position within the environment can be described by an XYZ coordinate. Systems and methods consistent with the present disclosure simulate the environment, determine attribute values at various "candidate" locations within the environment, and then leverage those values to automatically assign assets to proper locations. In some use cases, every location within the environment may be a candidate location. In some embodiments, only a subset of locations within the environment are evaluated as candidate locations (locations at which assets may be assigned). In some embodiments, locations may be defined relative to a basic geometry of a virtual environment (for example, a polygonal surface may be divided into regions, where each region is considered a location).

In some embodiments, attribute values may be determined at every point in an XYZ space. However, the size of a particular "candidate location" may vary based on use case. For example, in some use cases, attribute values may be unlikely to change dramatically over relatively small distances. Thus, in some embodiments, a "lower-resolution" evaluation may be utilized to conserve resources. For example, even if a virtual environment defines its space with a scale of 1 centimeter, a system may only determine attribute values every meter.

In creating (or maintaining) the virtual environment, assets are placed at (or "assigned to") various locations. Locations at which assets may be assigned may be distinguished as "candidate locations," which are locations configured to support assignment of one or more assets. To clarify, a location's status as a "candidate location," as used herein, is independent of whether a given asset is actually eligible (e.g., based on attribute values) to be assigned to the location. "Candidate location" simply means that the location is technically enabled to receive asset assignments. In some embodiments, all locations are candidate locations.

Systems and methods consistent with the present disclosure enable generating and leveraging "attribute maps" to automatically assign assets to candidate locations. As used herein, an "attribute map" refers to a data structure that stores attribute values of a particular attribute at multiple candidate locations within the virtual environment. In some embodiments, an attribute map may simply be a set of attribute values. For example, a light-level attribute map (also referred to herein as a "light-level map") may store a first light-level value representing the amount of light received at a first candidate location, a second light-level value representing the amount of light received at a second candidate location, and so on. A "heat map" (describing temperature with respect to location) is another example of an attribute map.

A subsystem of a virtual environment (such as movement of a sun of a virtual world) may be simulated. For example, a position of the sun at a given time (e.g., 11:00 in the virtual environment) may be calculated, and one or more rays (e.g., of light) may be traced from the sun's position to a location in the virtual environment, enabling a system to record a light level at the location. A system may then compare the recorded light level to an "attribute range" of an asset (such as a range of acceptable light levels associated with a tree asset). If the location receives enough light, the system may assign the tree to the location.

However, the amount of light received at the location at 11:00 may not constitute enough information to determine whether the tree asset should realistically be placed at the location. For example, the location may be in a valley such that it only receives substantial sunlight for a short window of time (e.g., 10:50-11:15). In such an example, even if the light level during that timeframe might be within the range for the tree asset, overall the location may be poorly lit to the point where a tree such as the asset would be unlikely to grow, so the presence of the tree asset at the location may be jarring to users of the virtual environment. Thus, it may be particularly advantageous to simulate the light level at the location at multiple times throughout a given period (e.g., one day), record multiple light levels, and aggregate the recorded values. This aggregate light level can then be compared to the attribute range of the tree asset, resulting in a more immersive assignment decision. These operations can be repeated for multiple locations of the environment and collated into attribute "maps" describing a particular attribute at a plurality of locations.

In some embodiments, attribute maps contain non-aggregate (e.g., "raw") values, in which case the maps themselves can be aggregated into aggregate attribute maps. In some embodiments, the aggregate attribute maps may be created by grouping the aggregate attribute values.

Thus, attribute maps may be generated by simulating a subsystem within the virtual environment, such as motion of a sun, movement of characters, etc., over a period of time. For example, a system may simulate the motion of a sun over the course of a day and generate a set of light maps, where each light map identifies the intensity of sunlight experienced at each candidate location for one hour of the day (resulting in 24 light maps, assuming a standard 24-hour day). In some embodiments, an aggregate attribute map may be then generated from the set of maps to represent an "average" or "overall" light level at each candidate location.

For example, a system consistent with the present disclosure may simulate the relative motion of the sun over a day and measure the amount of light reached at each of a number of different points at intervals throughout the day (e.g., every hour), thus creating a set of "attribute maps" (one map for each hour). The system may then determine an aggregated attribute map describing an average amount of light at each location, and leverage that aggregate map to determine and the asset properties to automatically determine where to place the asset(s)/which asset(s) (if any) to place at each location.

As a simple example, a virtual environment may include a field, an overhang, and a sun observing a day-night cycle. Assets to be placed in the environment may include plants, such as grass, mushrooms, trees, etc. An asset may be packaged or associated with attribute ranges describing where the asset can be located. For example, a tree asset's properties may include, for one or more attributes (such as overall light, temperature, etc.), a range of the attribute values required at a given location to allow the tree to grow there. The system may generate an attribute map as described above (or retrieve a previously-generated map) and compare the aggregate attribute values at various locations stored in the map with the attribute ranges of the assets. Thus, the system may automatically place mushrooms under the overhang and grass in the field. Notably, while much of the ground underneath the overhang may never receive direct sunlight, the system can determine if a portion of ground underneath the overhang (e.g., near an edge) receives enough light over the course of the day (if the sun is at an appropriate angle for long enough, for example) to result in an aggregate amount of light sufficient to support grass, but not enough to support a more light-demanding plant/asset.

FIG. 1 is a high-level simulation-based asset location assignment method 100, consistent with several embodiments of the present disclosure. Method 100 includes receiving a virtual environment at operation 102. Operation 102 may include, for example, receiving parameters describing a virtual environment (such as topology) as well as one or more subsystems of the environment (such as a lighting engine, parameters describing position/motion of a sun, etc.). In some embodiments, the virtual environment may have multiple possible distinct "states" (such as seasons), in which case operation 102 may further include receiving one or more state indicators as well as the parameters associated with one or more states. A "state," as used herein, may include, but is not limited to, a time of day of a virtual environment (e.g., dawn, midday, night), a season (e.g., fall, winter), weather (e.g., rain, cloudy, clear, snow), an in-environment event (e.g., a holiday event initiated by a developer of the virtual environment, an "invasion," etc.), status of one or more assets of the virtual environment (for example, a video game environment may change between states if players fulfill certain criteria, such as causing a "global" catastrophe, destroying a castle, etc.).

Method 100 further includes simulating the virtual environment over a duration at operation 104. Operation 104 may include, for example, loading or executing the environment (including one or more subsystems) and allowing/causing one or more of the environment's subsystems to operate over a time. For example, a virtual environment may include a field, an overhang, and a moving sun, where the movement of the sun over time is governed by a particular subsystem. Operation 104 may include loading the environment to a particular in-environment time (so, for example, a sun will be in a particular position based on a sun subsystem and the chosen in-environment time). In some embodiments, simulating over a duration may include simulating the environment continuously from a start time until an end time (e.g., starting a simulation at 10:00 of an in-environment clock, and allowing subsystems of the environment to execute until 11:00 of the in-environment clock). In some embodiments, simulating over a duration may include loading the environment to multiple different in-environment times. For example, operation 104 may include loading the environment at a first in-environment time (e.g., 10:00), then loading the environment to a second in-environment time, such as 10:05, and so on.

Method 100 further includes monitoring, recording, or otherwise determining attribute values during the simulation at operation 106. Operation 106 may include, for example, recording a value of a particular attribute at a particular location in the virtual environment at a given in-environment time. For example, if a sun is simulated at operation 104, operation 106 may include determining a light level at a location in the virtual environment (based on standard techniques such as raytracing). Thus, if the location is shadowed by an overhang in the environment, the determined light value may be relatively low. On the other hand, if the sun is directly overhead and the location is an open field, the determined light value may be relatively high.

Operation 106 may be performed for a number of locations and/or attributes within the environment, up to and including all locations and attributes. For example, in some embodiments, only a light level (attribute value) at a single location is recorded. In some embodiments, light, temperature, and wind levels are recorded at each location in the environment.

Operation 106 may be repeated at different times over the simulated duration. For example, in some embodiments, an environment's sun may transit across the sky over a period of 24 hours. In such an example, the sun's position may be simulated (operation 104) and the light level at each location may be recorded (operation 106) each hour over a 24-hour day, resulting in 24 sets (or "maps") of light levels.

Method 100 further includes determining an aggregate attribute value at operation 108. Operation 108 may include, for example, taking an arithmetic mean of a set of attribute values, the set including attribute values recorded (at operation 106) at multiple in-environment times. Operation 108 may be performed for a single location or, in some cases, sets of attribute values at multiple locations may be aggregated to generate a set or map of aggregate attribute values at locations in the environment.

Method 100 further includes assigning assets to candidate locations in the virtual environment based on aggregate attribute values at operation 110. Operation 110 may include determining, for one or more candidate locations, whether to assign a given asset to the candidate location(s) based on the attribute values at the candidate location(s). The decision of whether or not to assign the asset may be further based on an attribute range for the asset in question.

For example, the asset may be a tree, and the attribute range may be a range of light levels that the tree requires in order to be placed at a candidate location. Operation 110 further includes comparing the aggregate attribute value at a location to the attribute range of the asset and, based on the comparison, determining whether to assign the asset to the location. In some embodiments, if an asset is assigned to a location but a later determination is made to not assign the asset to the candidate location, the asset may be removed/"unassigned" from the location.

In some embodiments, assets may also have maximum and minimum attribute values that may further inform assignment decisions. Continuing with the previous example, the tree asset may have a minimum temperature (e.g., −40°, at or below which the tree would freeze and die. This minimum may be different from the lower value of the tree's temperature range (e.g., 0° to 45° Celsius) to represent that a tree may be able to survive a temporary exposure to a less-extreme temperature (e.g., −20° Celsius), even if the tree would not grow in a location at that temperature long-term. In other words, in the preceding example, even if some instantaneous recorded temperatures may be below 0° C., the tree may still be assigned to the candidate location so long as the aggregate temperature value is within the 0° to 45° C. range. However, if even a single temperature of the set is at or below −40°, the tree may not be placed at the candidate location (a mature tree may be placed at a location where the temperature briefly drops its livable range, but not if it drops low enough to kill the tree "instantly"). Similar maximums are considered as well. In some embodiments, the values may be considered over a smaller time span than the duration of the simulation (for example, if every day of a 90-day season is simulated, a minor aggregate may be calculated and checked for every 7-day span of the 90-day duration).

In some embodiments, some operations of method 100 may be performed in a "pre-runtime" mode, such as an "editor mode." For example, in at least one embodiment, operations 102-108 may be performed several times before runtime (of an application including the virtual environment) to generate one or more aggregate attribute values at candidate locations. Then, during runtime of the application, operation 110 may quickly reference the aggregate attribute values in assigning assets to locations. In some embodiments, multiple assets may be assigned to the same location.

Figure 2:
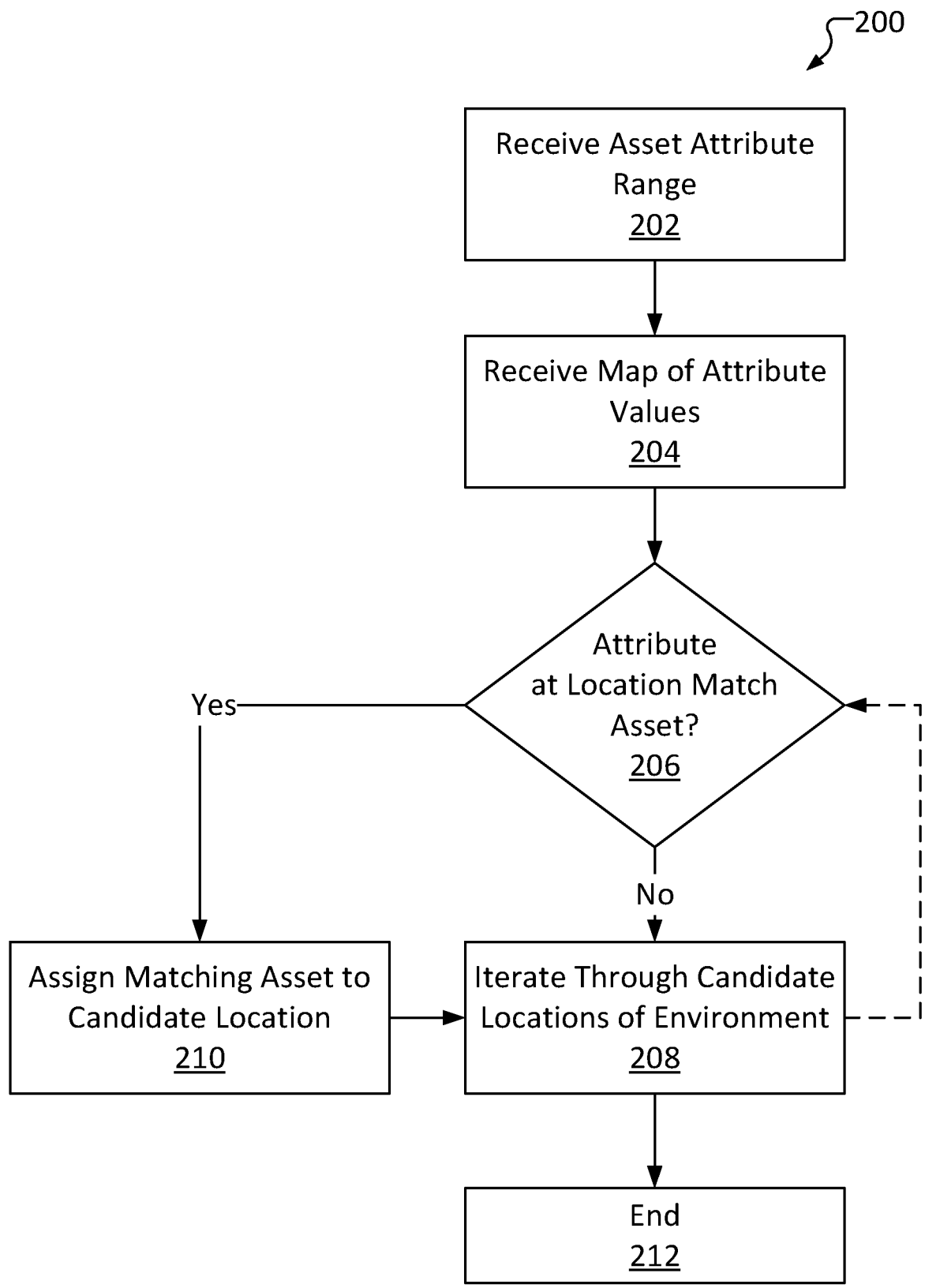
FIG. 2 is an asset location assignment method based upon an attribute map, consistent with several embodiments of the present disclosure.

FIG. 2 is an asset location assignment method 200 based upon an attribute map, consistent with several embodiments of the present disclosure. Method 200 includes receiving an asset attribute range at operation 202. Operation 202 may include receiving an array or other data structure associated (by way of an ID tag or similar) with an asset. The attribute range for a particular asset defines the requirements that must be met at a candidate location in order for that particular asset to be placed at the candidate location. For example, an asset may be a patch of grass. Operation 202 may include receiving an attribute range associated with the patch of grass indicating that the grass can only grow in a location with an aggregate light value between 0.3 and 0.9. In some embodiments, attribute ranges are received for each of a plurality of attributes. In some embodiments, if an attribute range is not received for a particular attribute, that attribute is considered irrelevant to assignment of the associated asset. For example, an asset such as a rock may not have an associated light value range, meaning the rock asset can be placed at a candidate location regardless of the candidate location's aggregate light value.

Method 200 further includes receiving an attribute map at operation 204. Operation 204 may include, for example, receiving a map comprising a set of aggregate attribute values, where the aggregate attribute values are calculated based on one or more sets of attribute values recorded during simulation of a virtual environment. For example, if an environment includes 9 candidate locations, operation 204 may include receiving an attribute map including 9 aggregate attribute values, each describing an attribute (e.g., light level) at one candidate location. However, in some embodiments, the attribute map may not include attribute values for every candidate location (e.g., even if an environment has 9 candidate locations, the attribute map may only include values for 5 of them).

Method 200 further includes comparing, at operation 206, an aggregate attribute value at a candidate location that was received at operation 204 to the attribute range associated with an asset that was received at operation 202. If the aggregate attribute value at the candidate location is within the asset range of an asset (206 "Yes"), method 200 further includes assigning the associated asset to the candidate location at operation 210. If the aggregate attribute value at the candidate location is within the asset range of each of a group of multiple assets, an asset is selected from the group and assigned to the location. This selection may be based on, for example, the attribute value (e.g., which asset range's center the value is closest to), surrounding assets (for example, assets in nearby locations may be more or, in some embodiments, less likely to be selected from a group), random selection, etc., or a combination thereof. Operation 210 may include, for example, placing an asset at the candidate location within the virtual environment, or storing information associating the asset with the candidate location (such that actual "placement" can take place later). In some embodiments, attribute values (and their aggregates) may be recalculated after placing an asset (to account for assets themselves impacting the attribute values, such as by trees casting shadows, etc.).

If one or more of the aggregate attribute values at the location do not match those of an asset (206 "No"), or after assigning the asset (210), method 200 further includes iterating through candidate locations of the virtual environment at operation 208. Operation 208 may include, for example, repeating operations 206 (and 210, as appropriate) at least once for every candidate location of the virtual environment. Method 200 ends at 212.

In some embodiments, if a candidate location does not have an aggregate attribute value in the map, no asset may be assigned to the location, while in other embodiments, a "default" asset may be assigned (such as grass or, in some use cases, an error flag asset to help notify a developer of the virtual environment that the candidate location does not have an aggregate attribute value).

In some embodiments, multiple assets may be assigned to the same candidate location. For example, in some embodiments, even after an asset has been assigned to a candidate location, the candidate location may still be checked for other eligible asset assignments. Assets may also be grouped, enabling systems to dictate whether assets of a given group can be assigned to the same candidate location as assets of a different group. As one non-limiting example, plant assets may be in a first group, insect assets may be in a second group, while structure assets (such as houses) may be in a third group. In such an example, the first and second groups may be "inclusive" relative to one another (indicated via a data flag set by a developer) such that a plant and an insect may be assigned to the same candidate location, while the first and third groups may be "exclusive" relative to one another, such that once a plant has been assigned to a location, a structure cannot be assigned to the same candidate location and vice versa. As an additional example, rather than or in addition to grouping, assets may be specifically designated as inclusive or exclusive relative to other specific assets. As a further example, candidate locations may indicate whether or not they are "shareable" (whether more than one asset can be assigned to the candidate location). Further examples include a weighted budget system wherein a candidate location has a given "budget" (e.g., 5 points) and assets have individual "costs" (e.g., an insect may cost 0.1 points, a mushroom costing 0.5 points, a tree costing 4 points, etc.). Other implementations are also considered.

An asset may have multiple attribute ranges associated with different attributes. In some embodiments, all attribute ranges must be "satisfied" for an asset to be assigned to a candidate location. For example, if a candidate location's light value and heat are within a plant's corresponding ranges, but the candidate location's wind value is outside the range, the plant may not be assigned to the candidate location and method 200 iterates through candidate locations via operation 208. In some embodiments, only certain asset ranges must be satisfied (while other asset ranges may be used in making selections between multiple viable assets as discussed with reference to operation 206).

Figure 3A:
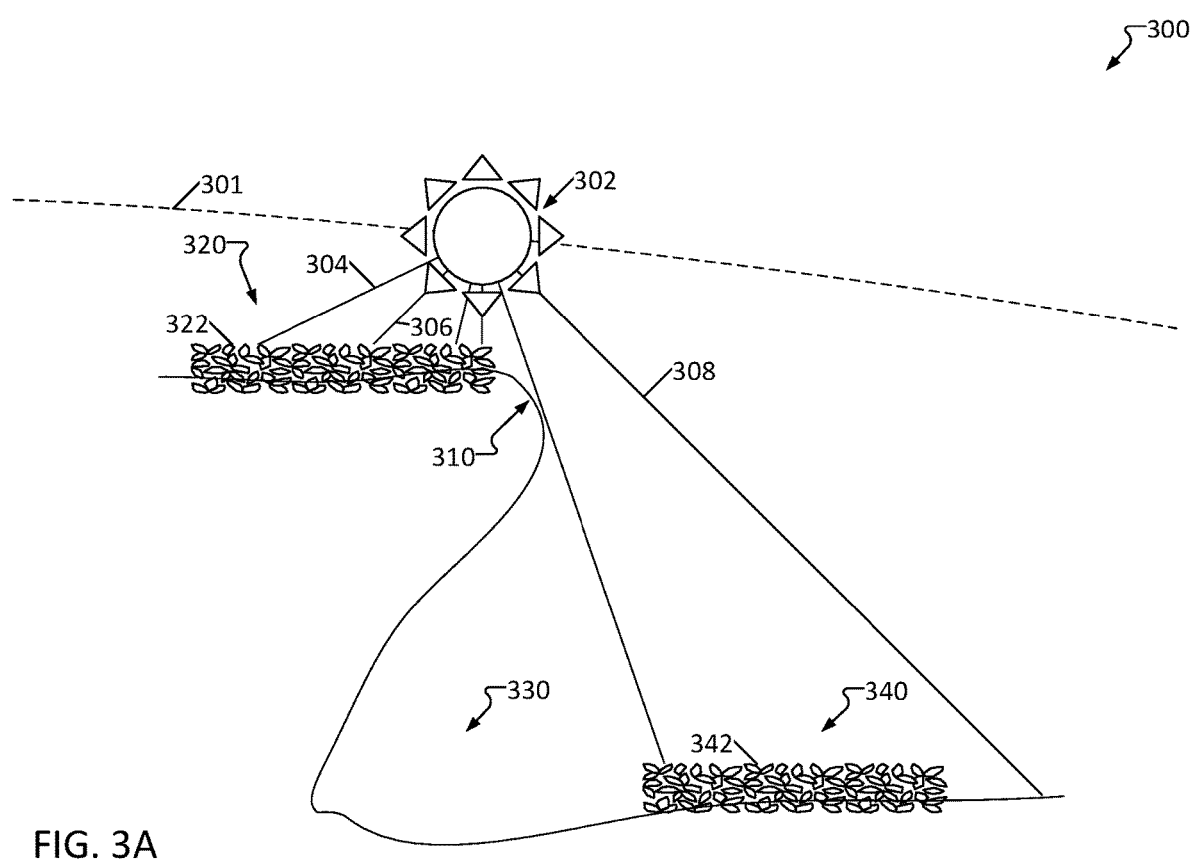
FIG. 3A is an example virtual environment with assets assigned to asset locations based on a simulation of the environment, consistent with several embodiments of the present disclosure.

FIG. 3A is an example virtual environment 300 at a first time with assets assigned to asset locations based on a simulation of the environment, consistent with several embodiments of the present disclosure. Virtual environment 300 includes sun 302 and terrain features such as overhang 310. Virtual environment 300 further includes candidate asset locations 320, 330 and 340, to which one or more assets such as foliage 322 and foliage 342 may be assigned. As shown in FIG. 3A, foliage 322 is assigned to candidate location 320 and foliage 342 and is assigned to candidate location 340. No assets are depicted as assigned to candidate location 330.

Assets such as foliage 322 may be assigned to candidate locations based on simulation of virtual environment 300. For example, foliage 322 may be associated with a particular range of attribute values, such as light levels, required at a candidate location in order for foliage 322 to be assigned to the location.

FIG. 3A depicts virtual environment 300 in a first state (such as a first season), wherein sun 302 transits along a first path 301. While FIG. 3A depicts virtual environment 300 at a first time, environment 300 may be configured to change over time. For example, a position of sun 302 may change over time. As light rays 304, 306, 308 are emitted from sun 302, different positions of sun 302 may result in light rays 304, 306, 308 impacting different locations within environment 300. Thus, while no light rays may make contact with terrain at candidate location 330 (suggesting candidate location 330 does not receive direct sunlight), this may not be the case at all times in environment 300.

Figure 3B:
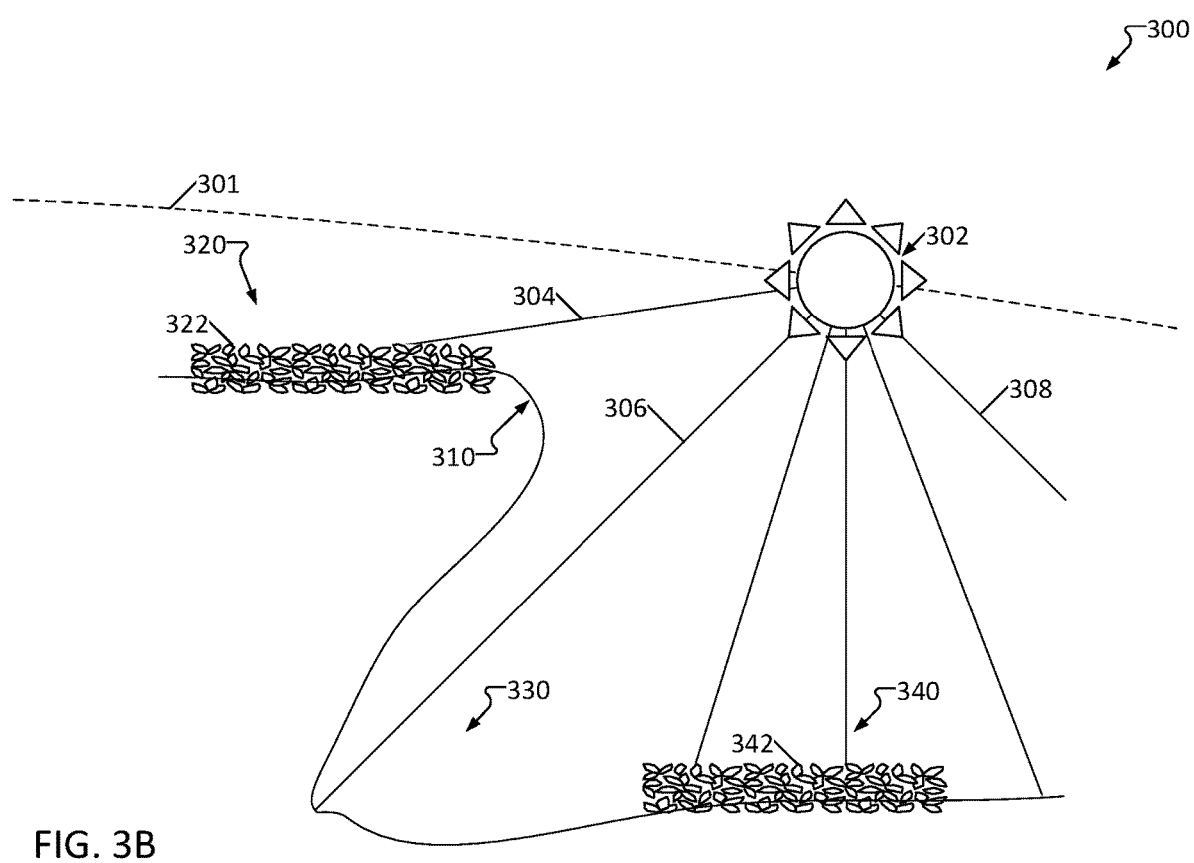
FIG. 3B depicts virtual environment at a second in-environment time, consistent with several embodiments of the present disclosure.

FIG. 3B depicts virtual environment 300 at a second in-environment time, consistent with several embodiments of the present disclosure. Notably, sun 302 is in a different position along first path 301, enabling light ray 306 to reach candidate location 330.

Systems and methods consistent with the present disclosure may simulate environment 300 at both times depicted in FIGS. 3A and 3B, record attribute values based on the simulation, and determine an aggregate attribute value based on the recorded values. For example, light rays 304, 306 and 308 may be traced (e.g., via ray tracing) to determine how much light is received from sun 302 at a location such as candidate location 330. The light levels determined at both times may be aggregated to determine an aggregate light level at candidate location 330. Thus, while candidate location 330 may receive direct sunlight (ray 306) at the second time (depicted in FIG. 3B), the aggregate light level at candidate location 330 may still be low enough to be outside the range necessary to place a foliage asset (such as foliage assets 322, 342) at candidate location 330. Thus, the assets may not be assigned to candidate location 330.

Figure 3C:
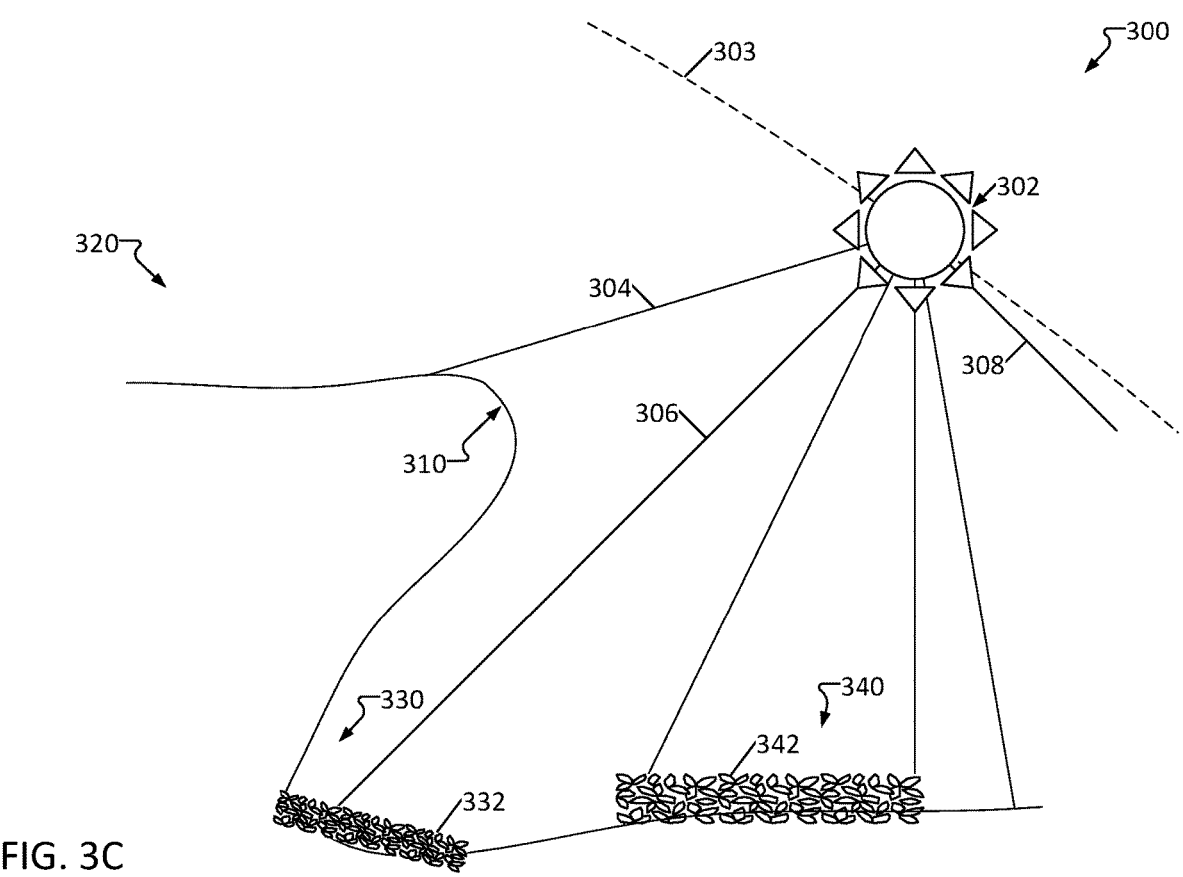
FIG. 3C depicts virtual environment in a second state, consistent with several embodiments of the present disclosure.

FIG. 3C depicts virtual environment 300 in a second state, consistent with several embodiments of the present disclosure. The second state may include, for example, a second season. This may affect one or more subsystems of environment 300. Notably, in this second state of virtual environment 300, sun 302 traverses a second path 303. This second path 303 may result in candidate location 330 receiving direct sunlight more frequently throughout an in-environment time period (such as a day), resulting in a larger aggregate light level at candidate location 330. Similarly, the subsystem that simulates light rays 304, 306, and 308 may be configured to simulate rays of different (e.g., greater) light levels in the season depicted in FIG. 3C. For this reason, the amount of direct-sunlight time necessary for a candidate location to reach an asset's range of aggregate light level may be lower in FIG. 3C than in FIGS. 3A and 3B. Thus, foliage 332 may be assigned to candidate location 330. Further, a light level at candidate location 320 may no longer be within the range necessary to place a foliage asset, and therefore foliage asset 322 may be removed from location 320. This could be caused by the sun emitting increased light levels causing the aggregate light value at location 320 to be above the maximum of the foliage asset's range. Alternatively, it could result from the sun's new path 303 no longer providing as much direct sunlight to candidate location 320, so the aggregate light level at candidate location 320 may be below the minimum necessary to support the foliage asset.

While FIG. 3A and FIG. 3B depict a maximum of one asset assigned to each location, in some embodiments, multiple assets may be assigned to a single location. For example, an asset such as an insect (not shown in FIG. 3A or FIG. 3B) may be assigned to the same location as a plant asset, such as foliage 342.

Figure 4:
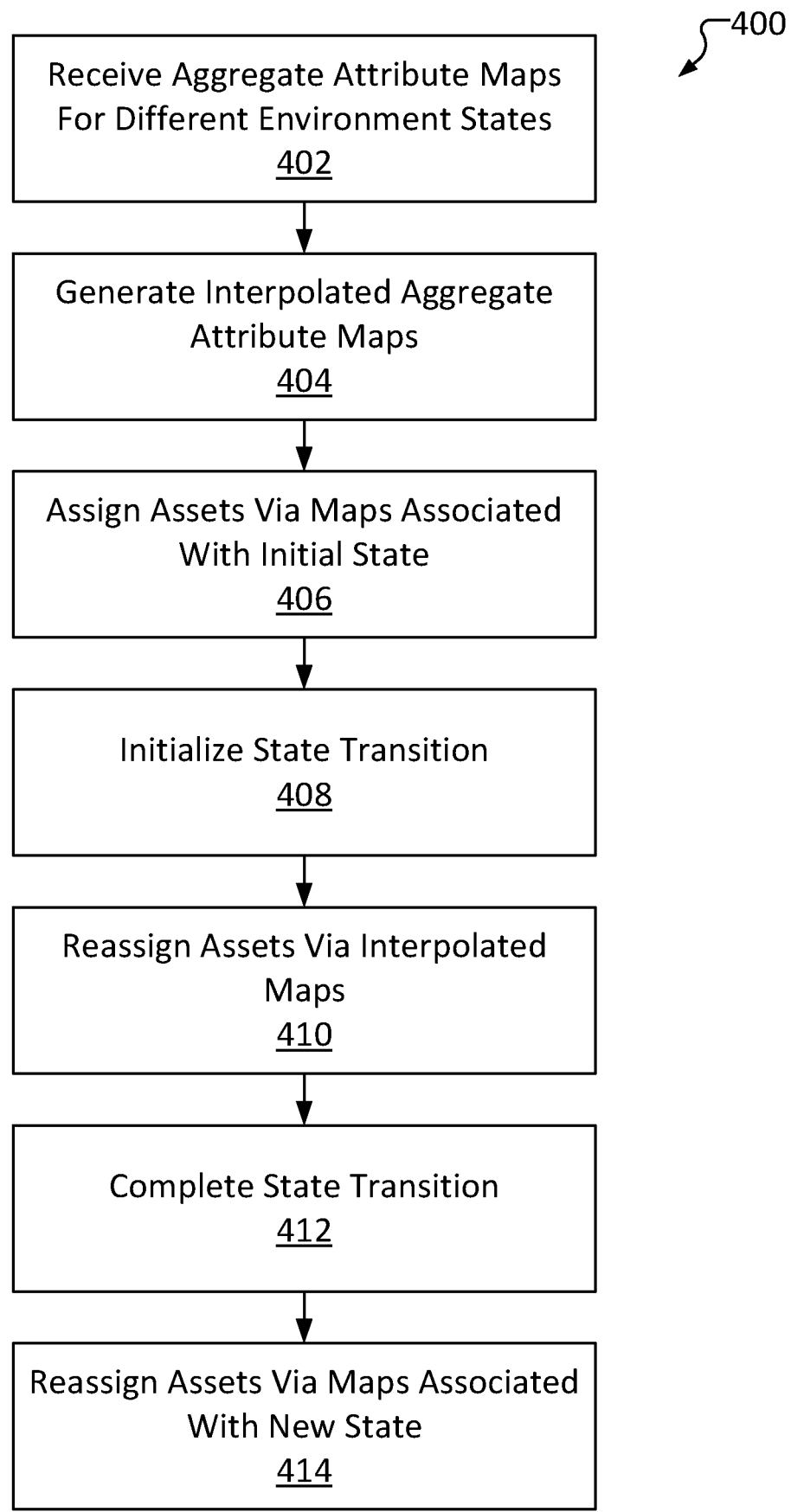
FIG. 4 is an asset location reassignment method based upon a state transition of a virtual environment, consistent with several embodiments of the present disclosure.

FIG. 4 is an asset location assignment revision method 400 based upon a state transition of a virtual environment, consistent with several embodiments of the present disclosure. While an environment may change over time as governed by one or more subsystems (e.g., a day/night cycle resulting from movement of a sun), a "state transition," as used herein, refers to a higher-level change typically including changes to parameters of a subsystem itself. An example state transition is a change from a first season to a second season. In such a change, parameters of a sun subsystem may be modified. For example, a path of the sun over the course of an in-environment day may differ between a first season and a second season, as illustrated by first path 301 of sun 302 of FIG. 3A and FIG. 3B in comparison with second path 303 of FIG. 3C. Other parameter changes are also possible; for example, an intensity of light emitted by the sun may differ between seasons, etc.

Method 400 includes receiving aggregate attribute maps for different states of an environment at operation 402. Operation 402 may include, for example, receiving a first aggregate attribute map describing aggregate attribute values of a first attribute (e.g., light level) for one or more candidate locations within the environment. The first aggregate attribute map may be associated with a first state of the environment. Operation 402 may further include receiving a second aggregate attribute map describing aggregate attribute values of the first attribute for the candidate locations within the environment when the environment is in a second state. The attribute maps received at operation 402 may be generated via simulating the environment, such as via method 100 of FIG. 1.

Notably, the aggregate attribute values at a particular location may differ between states of the virtual environment. This may result in, for example, an asset assignment no longer being valid at the location after the transition (or newly becoming valid). As an example, if the asset is a plant requiring a given range of sunlight, the aggregate amount of sunlight received at a given location may be within the attribute range of the plant asset when the environment is in the first state, but once the environment changes to the second state, the asset may no longer be assigned to that location. This may advantageously enable virtual assets to be dynamically reassigned in a relatively realistic manner (e.g., the plant may die, or be replaced with a different asset depicting a "wilted" version of the plant, etc.).

Method 400 further includes generating one or more interpolated aggregate attribute maps at operation 404. Operation 404 may include, for example, determining an arithmetic mean of two attribute maps describing the same attribute in two different states of the environment. As a clarifying example, a first attribute map may describe aggregate light levels of the environment during a summer season. A second attribute map may describe aggregate light levels of the environment during a fall season. In such an example, operation 404 includes generating a third attribute map by taking an average of the summer and fall aggregate light levels at each location. This interpolated aggregate attribute map may represent a "transitional" state of the environment (e.g., at the end of a summer season/beginning of a fall season), and may be generated without requiring additional simulations. Other techniques for generating the interpolated aggregate attribute map (other than an arithmetic mean) are also possible, such as linear interpolation.

In some embodiments, operation 404 may include generating multiple interpolated aggregate attribute maps for the same attribute to represent multiple transition states. For example, a system performing method 400 may support multiple intermediate states between a first state and a second state. Thus, operation 404 may include generating a different interpolated aggregate attribute map for each intermediate state. As an example, a system supporting a single intermediate state may generate an interpolated aggregate attribute map representing the "midpoint" of the transition between summer and fall. This may be accomplished by taking an arithmetic mean of a summer aggregate attribute map and a fall aggregate attribute map to represent a linear transition from summer to fall. The exact implementation may vary depending upon use case. For example, if a system supports three intermediate states, operation 404 may include generating a first interpolated aggregate attribute map by weighting the summer aggregate attribute map more heavily than the fall aggregate attribute map, generating a second interpolated aggregate attribute map by weighting the summer and fall maps equally, and generating a third interpolated aggregate attribute map by weighting the fall map more heavily than the summer map.

In some embodiments, operation 404 may include generating an interpolated aggregate attribute map for each attribute (e.g., one for light, one for heat, one for foot traffic, etc.). Similarly, in the case of multiple intermediate states, a system performing method 400 may generate a different set of maps (each set including an interpolated aggregate attribute map for each attribute) for each intermediate state.

Method 400 further includes assigning assets via maps associated with the first (initial) state at operation 406. Operation 406 may include, for example, assessing aggregate attribute values at candidate locations and comparing them to attribute ranges of one or more assets in order to determine which asset, if any, to assign to each candidate location. Operation 406 may generally include operations analogous to method 200 of FIG. 2 using one of the maps received at operation 402.

Method 400 further includes initializing a state transition at operation 408. Operation 408 may include, for example, causing a virtual environment to begin a gradual change from the first state to the second state. This transition may take place over time, such as a summer season transitioning into a fall season.

Method 400 further includes reassigning assets via interpolated aggregate attribute maps at operation 410. Operation 410 may be performed in a manner substantially similar to operation 406, but using an interpolated aggregate attribute map generated at operation 404. As the interpolated aggregate attribute map may represent an intermediate state between the first state and the second state, operation 410 advantageously enables a more gradual shift between states. For example, if an environment includes a first set of plants during a summer season which will be replaced by a second set of plants during a fall season, operation 410 may enable replacing only some summer plants with fall plants (at locations where the attribute values would cross a threshold from "summer plant range" to "fall plant range" first) rather than a sudden environment-wide switch. In the case of "multiple intermediate states," operation 410 may be repeated periodically utilizing different interpolated aggregate attribute maps to make the transition from the first state to the second state even more gradual.

Method 400 further includes completing the state transition at operation 412. Operation 412 may include, for example, completing a season change (such as from summer to fall). Once the state transition is complete, method 400 further includes reassigning assets via maps associated with the second state at operation 414. Operation 414 may be performed in a substantially similar manner to operations 406 and/or 410 but using an aggregate attribute map associated with the second state (this map is received at operation 402).

Figure 5:
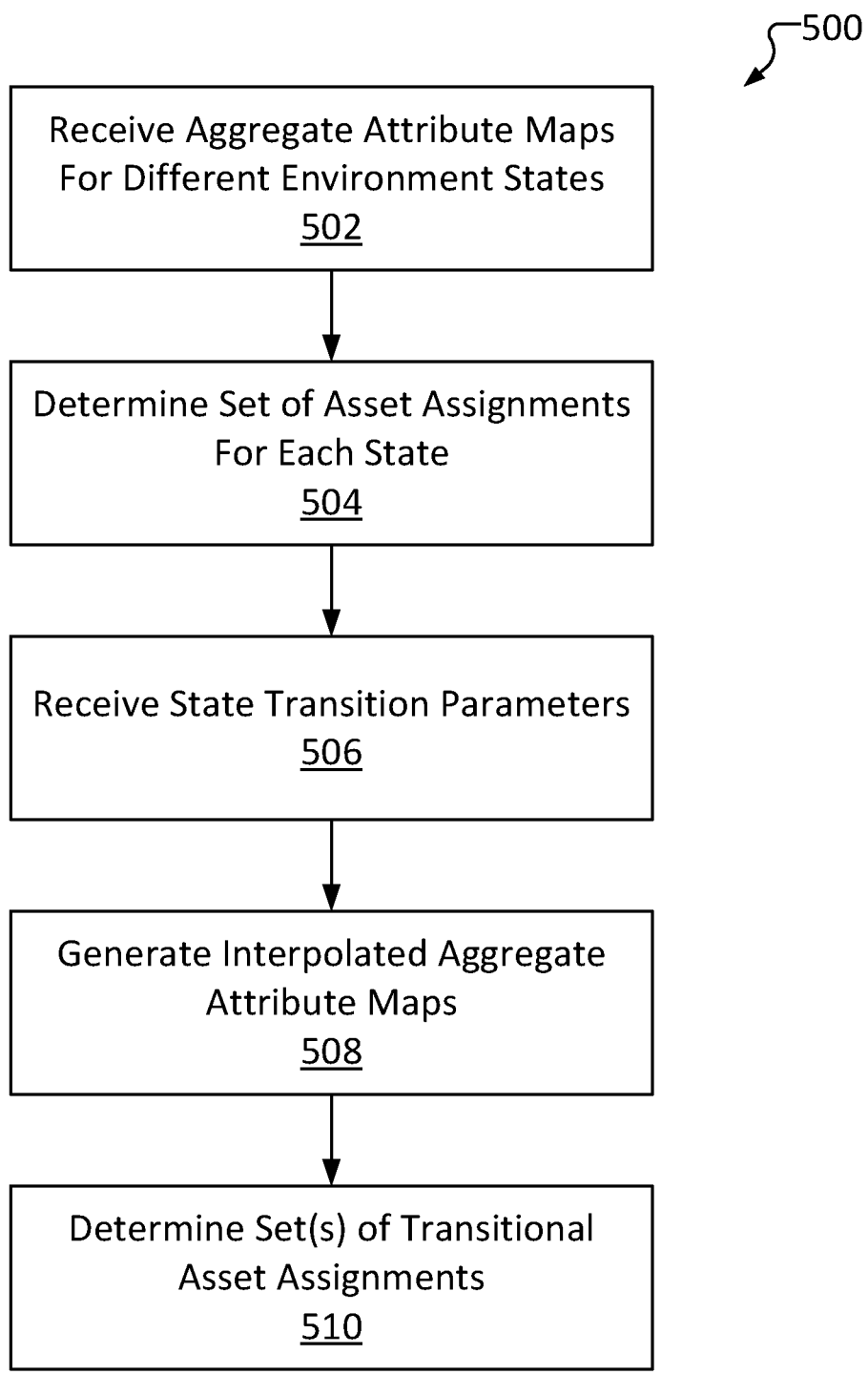
FIG. 5 is an asset location assignment method based upon a state of a virtual environment, consistent with several embodiments of the present disclosure.

FIG. 5 is an asset location assignment method 500 based upon a state of a virtual environment, consistent with several embodiments of the present disclosure. Method 500 includes receiving aggregate attribute maps for different environment states at operation 502. Operation 502 may include, for example, receiving a first aggregate attribute map describing aggregate attribute values of a first attribute (e.g., light level) for one or more candidate locations within the environment. The first aggregate attribute map may be associated with a first state of the environment. Operation 502 may further include receiving a second aggregate attribute map describing aggregate attribute values of the first attribute for the candidate locations within the environment when the environment is in a second state. The attribute maps received at operation 502 may be generated via simulating the environment, such as via method 100 of FIG. 1.

Method 500 further includes determining a set of asset assignments for each state at operation 504. Operation 504 may include, for example, assessing aggregate attribute values at candidate locations and comparing them to attribute ranges of one or more assets in order to determine which asset, if any, to assign to each candidate location. Operation 504 may generally include operations analogous to method 200 of FIG. 2 (using one of the maps received at operation 502).

Operation 504 may include generating and storing a set of assignments associated with each state. This assignment set may be utilized by a system managing the virtual environment to quickly assign assets to locations when the environment is in the associated state. For example, operation 504 may include generating and storing a set of summer assignments and a set of fall assignments. Thus, if a system changes from summer to fall, the system need only load the appropriate set of assignments.

Method 500 further includes receiving state transition parameters at operation 506. Operation 506 may include, for example, receiving a number of intermediate states to be implemented during a transition between a first state and a second state. For example, operation 506 may include receiving an indication that a transition from a summer season to a fall season will include 3 intermediate states. In some embodiments, the parameters received at operation 506 may further identify a nature of the state transition (e.g., whether the transition is linear, geometric, etc.).

Method 500 further includes generating interpolated aggregate attribute maps at operation 508. Operation 508 may include, for example, determining an arithmetic mean of an aggregate attribute map associated with an initial state and an aggregate attribute map associated with a target state, both of which may be received at operation 502. The interpolated aggregate attribute map may be determined based further on the state transition parameters received at operation 506. The parameters received at operation 506 may further dictate how many interpolated aggregate attribute maps are generated at operation 508.

Method 500 further includes determining one or more sets of transitional asset assignments at operation 510. Operation 510 may be performed in a manner substantially similar to operation 504, but using the interpolated aggregate attribute map(s) generated at operation 508. As the interpolated aggregate attribute map(s) may represent one or more intermediate states between the first state and the second state, operation 510 advantageously enables a more gradual shift between states. Similar to operation 504, the transitional assignment sets are stored in memory, enabling a system managing a virtual environment to quickly implement state transitions (e.g., without having to perform attribute comparisons and/or simulations during runtime).

Figure 6:
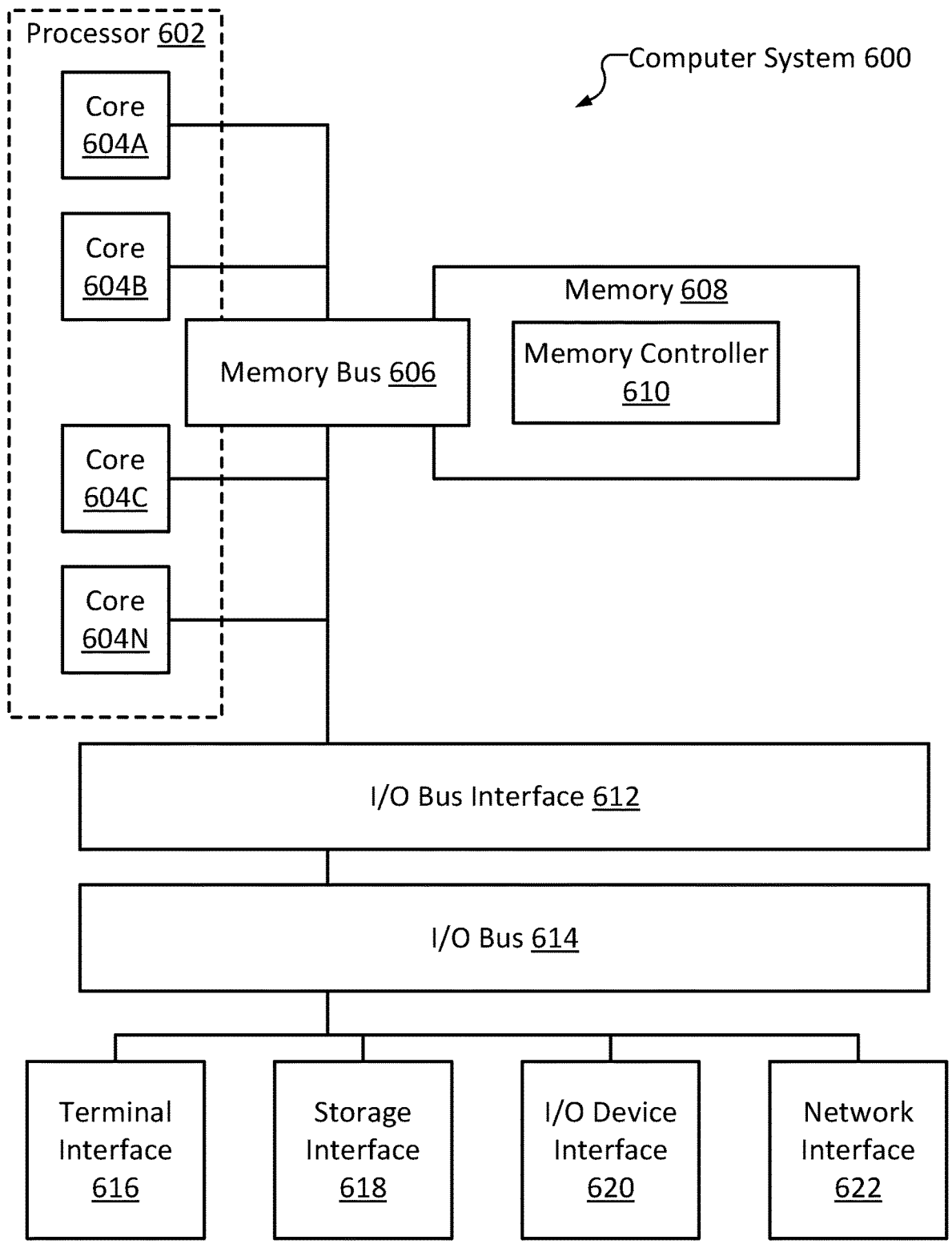
FIG. 6 illustrates a high-level block diagram of an example computer system that may be used in implementing embodiments of the present disclosure.

Referring now to FIG. 6, shown is a high-level block diagram of an example computer system 600 that may be configured to perform various aspects of the present disclosure, including, for example, methods 100, 200, 400 and 500. The example computer system 600 may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise one or more CPUs 602, a memory subsystem 608, a terminal interface 616, a storage interface 618, an I/O (Input/Output) device interface 620, and a network interface 622, all of which may be communicatively coupled, directly or indirectly, for inter-component communication via a memory bus 606, an I/O bus 614, and an I/O bus interface unit 612.

The computer system 600 may contain one or more general-purpose programmable central processing units (CPUs) 602, some or all of which may include one or more cores 604A, 604B, 604C, and 604D, herein generically referred to as the CPU 602. In some embodiments, the computer system 600 may contain multiple processors typical of a relatively large system; however, in other embodiments the computer system 600 may alternatively be a single CPU system. Each CPU 602 may execute instructions stored in the memory subsystem 608 on a CPU core 604 and may comprise one or more levels of on-board cache.

In some embodiments, the memory subsystem 608 may comprise a random-access semiconductor memory, storage device, or storage medium (either volatile or non-volatile) for storing data and programs. In some embodiments, the memory subsystem 608 may represent the entire virtual memory of the computer system 600 and may also include the virtual memory of other computer systems coupled to the computer system 600 or connected via a network. The memory subsystem 608 may be conceptually a single monolithic entity, but, in some embodiments, the memory subsystem 608 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 602. This may include a memory controller 610.

Although the memory bus 606 is shown in FIG. 6 as a single bus structure providing a direct communication path among the CPU 602, the memory subsystem 608, and the I/O bus interface 612, the memory bus 606 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 612 and the I/O bus 614 are shown as single respective units, the computer system 600 may, in some embodiments, contain multiple I/O bus interface units 612, multiple I/O buses 614, or both. Further, while multiple I/O interface units are shown, which separate the I/O bus 614 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of assigning virtual assets, the method comprising:
    receiving a virtual environment having a plurality of candidate locations and state information, wherein each of the plurality of candidate locations comprises a first candidate location that includes a first attribute, and wherein the state information comprises weather conditions associated with the virtual environment;
    simulating the virtual environment over a first duration based on the state information;
    recording, based on the simulating over the first duration, a first set of simulated attribute values, the first set of simulated attribute values including:
        a first simulated attribute value for the first attribute at the first candidate location at a first time during the first duration; and
        a second simulated attribute value for the first attribute at the first candidate location at a second time during the first duration;
    determining, based on the first set of simulated attribute values, a first simulated aggregate attribute value for the first attribute at the first candidate location over the first duration;
    receiving a first attribute range for a first asset, wherein the first attribute range is a range of acceptable attribute values for the first asset;
    determining whether the first simulated aggregate attribute value is within the received first attribute range and assigning the first asset to the first candidate location in response to the first simulated aggregate value being within the received first attribute range;
    repeating the aforesaid method operations a plurality of times for a plurality of sets of simulated attribute values at the plurality of candidate locations to determine a plurality of simulated aggregate attribute values;

generating a simulated attribute map from the plurality of simulated aggregate attribute values, wherein the attribute map includes a data structure configured to store the plurality of simulated aggregate attribute values for each of the plurality of sets of simulated attribute values at the plurality of candidate locations;

determining, based on the simulated attribute map, whether at least one of the plurality of simulated aggregate attribute values is within at least one short-term and long-term corresponding attribute ranges that define acceptable attribute values corresponding to asset placement, wherein the at least one short-term acceptable range of attribute values is between a minimum attribute value and a maximum value required for short-term placement of the first asset at a location among the plurality of candidate locations and the at least one long-term acceptable range of attribute values is between a minimum attribute value and a maximum attribute value that would be required for long-term placement of the first asset at a location amongst the plurality of candidate locations;

assigning, based on a determination that at least one of the plurality of simulated aggregate attribute values is within the corresponding attribute range of acceptable attribute values, at least one first asset to a subset of the plurality of candidate locations, wherein multiple of the plurality of assets are assigned to the subset of the plurality of candidate locations; and returning information indicating the assignment of the at least one first asset to the subset of the plurality of candidate locations to conform to the acceptable ranges of attribute values for short-term and long-term placement.

2. The method of claim 1, wherein:

the virtual environment includes a second candidate location;

the first set of simulated attribute values further includes:
 a third simulated attribute value for the first attribute at the second candidate location at the first time during the first duration; and
 a fourth simulated attribute value for the first attribute at the second candidate location at the second time during the first duration; and the method further comprises:
 determining, based on the third simulated attribute value and the fourth simulated attribute value, a second simulated aggregate attribute value for the first attribute at the second candidate location over the first duration;
 receiving a second attribute range for a second asset; and
 determining, based on the second attribute range and the second simulated aggregate attribute value, to not assign the second asset to the second candidate location.

3. The method of claim 2, further comprising:

simulating the virtual environment over a second duration;

recording, based on the simulating over the second duration, a second set of simulated attribute values, the second set of simulated attribute values including:
 a fifth simulated attribute value for the first attribute at the first candidate location at a third time during the second duration;
 a sixth simulated attribute value for the first attribute at the first candidate location at a fourth time during the second duration;
 a seventh simulated attribute value for the first attribute at the second candidate location at the third time during the second duration; and
 an eighth simulated attribute value for the first attribute at the second candidate location at the fourth time during the second duration;

determining, based on the fifth simulated attribute value and the sixth simulated attribute value, a third simulated aggregate attribute value for the first attribute at the first candidate location over the second duration;

determining, based on the seventh simulated attribute value and the eighth simulated attribute value, a fourth simulated aggregate attribute value for the first attribute at the second candidate location over the second duration;

determining, based on the first attribute range and the third simulated aggregate attribute value, to not assign the first asset to the first candidate location during the second duration; and determining, based on the second attribute range and the fourth simulated aggregate attribute value, to assign the second asset to the second candidate location during the second duration.

4. The method of claim 3, further comprising:

determining, based on the first simulated aggregate attribute value and the third simulated aggregate attribute value, a first interpolated attribute value for the first attribute at the first candidate location over a third duration;

determining, based on the second simulated aggregate attribute value and the fourth simulated aggregate attribute value, a second interpolated attribute value for the first attribute at the second candidate location over the third duration;

determining, based on the first attribute range and the first interpolated attribute value, not to assign the first asset to the first candidate location during the third duration; and determining, based on the second attribute range and the second interpolated attribute value, to assign the second asset to the second candidate location during the third duration.

5. The method of claim 1, further comprising:

receiving a second attribute range for a second asset;

simulating the virtual environment over a second duration;

recording, based on the simulating over the second duration, a second set of simulated attribute values, the second set of simulated attribute values including:
 a third simulated attribute value for the first attribute at the first candidate location at a third time during the second duration; and
 a fourth simulated attribute value for the first attribute at the first candidate location at a fourth time during the second duration;

determining, based on the third simulated attribute value and the fourth simulated attribute value, a second simulated aggregate attribute value for the first attribute at the first candidate location over the second duration;

detecting that the second simulated aggregate attribute value is out of the first attribute range and within the second attribute range;

determining, based on the detecting that the second simulated aggregate attribute value is out of the first attribute range, to not assign the first asset to the first candidate location; and determining, based on the detecting that the second simulated aggregate attribute value is within the second attribute range, to assign the second asset to the first candidate location.

6. The method of claim 1, wherein the first candidate location is a second asset.

7. The method of claim 1, wherein the state information comprises at least one of a time of day, a season, an in-environment event, or a status of any one or more of the plurality of assets in the virtual environment.

8. A method of assigning virtual assets, the method comprising:
receiving a virtual environment having a plurality of candidate locations and state information, wherein each of the plurality of candidate locations comprises a first candidate location that includes a first attribute, and wherein the state information comprises weather conditions associated with the virtual environment;
simulating the virtual environment over a first duration based on the state information;
recording, based on the simulating over the first duration, a first set of simulated attribute values, the first set of simulated attribute values including:
a first simulated attribute value for the first attribute at the first candidate location at a first time during the first duration; and
a second simulated attribute value for the first attribute at the first candidate location at a second time during the first duration;
determining, based on the first set of simulated attribute values, a first simulated aggregate attribute value for the first attribute at the first candidate location over the first duration;
receiving a first attribute range for a first asset, wherein the first attribute range is a range of acceptable attribute values for the first asset;
determining whether the first simulated aggregate attribute value is within the received first attribute range and assigning the first asset to the first candidate location in response to the first simulated aggregate value being within the received first attribute range;
repeating the aforesaid method operations a plurality of times for a plurality of sets of simulated attribute values at the plurality of candidate locations to determine a plurality of aggregate attribute values;
generating an attribute map from the plurality of simulated aggregate attribute values, wherein the attribute map includes a data structure configured to store the plurality of simulated aggregate attribute values for each of the plurality of sets of simulated attribute values at the plurality of candidate locations; and
determining, based on the simulated attribute map, whether at least one of the plurality of simulated aggregate attribute values is within at least one short-term and long-term corresponding attribute ranges that define acceptable attribute values corresponding to asset placement, wherein the at least one short-term acceptable range of attribute values is between a minimum attribute value and a maximum value required for short-term placement of the first asset at a location among the plurality of candidate locations and the at least one acceptable long-term range of attribute values is between a minimum and a maximum attribute value that would be required for long-term placement of the first asset at a location amongst the plurality of candidate locations;
assigning at least one first asset to a subset of the plurality of candidate locations based on a determination that (i) at least one of the plurality of simulated aggregate attribute values is within the corresponding attribute range and (ii) a cost of the at least one first asset complies with budgets at the subset of the plurality of candidate locations, wherein multiple of the plurality of assets are assigned to a same candidate location of the subset of the plurality of candidate locations,
wherein the budget compliance requires that the cost of the assets assigned to the same candidate location total less than a total amount of budgeted available points for the same candidate location; and
returning information indicating the assignment of the at least one first asset to the subset of the plurality of candidate locations to conform to the acceptable ranges of attribute values for short-term and long-term placement.

9. The method of claim 8, wherein:
the virtual environment includes a second candidate location;
the first set of simulated attribute values further includes:
a third simulated attribute value for the first attribute at the second candidate location at the first time during the first duration; and
a fourth simulated attribute value for the first attribute at the second candidate location at the second time during the first duration; and
the method further comprises:
determining, based on the third simulated attribute value and the fourth simulated attribute value, a second simulated aggregate attribute value for the first attribute at the second candidate location over the first duration;
receiving a second attribute range for a second asset; and
determining, based on the second attribute range and the second simulated aggregate attribute value, to not assign the second asset to the second candidate location.

10. The method of claim 9, wherein the method further comprises:
simulating the virtual environment over a second duration;
recording, based on the simulating over the second duration, a second set of simulated attribute values, the second set of simulated attribute values including:
a fifth simulated attribute value for the first attribute at the first candidate location at a third time during the second duration;
a sixth simulated attribute value for the first attribute at the first candidate location at a fourth time during the second duration;
a seventh simulated attribute value for the first attribute at the second candidate location at the third time during the second duration; and
an eighth simulated attribute value for the first attribute at the second candidate location at the fourth time during the second duration;
determining, based on the fifth simulated attribute value and the sixth simulated attribute value, a third simulated aggregate attribute value for the first attribute at the first candidate location over the second duration;
determining, based on the seventh simulated attribute value and the eighth simulated attribute value, a fourth simulated aggregate attribute value for the first attribute at the second candidate location over the second duration;

determining, based on the first attribute range and the third simulated aggregate attribute value, to not assign the first asset to the first candidate location during the second duration; and determining, based on the second attribute range and the fourth simulated aggregate attribute value, to assign the second asset to the second candidate location during the second duration.

11. The method of claim 10, wherein the method further comprises:

determining, based on the first simulated aggregate attribute value and the third simulated aggregate attribute value, a first interpolated attribute value for the first attribute at the first candidate location over a third duration;

determining, based on the second simulated aggregate attribute value and the fourth simulated aggregate attribute value, a second interpolated attribute value for the first attribute at the second candidate location over the third duration;

determining, based on the first attribute range and the first interpolated attribute value, not to assign the first asset to the first candidate location during the third duration; and determining, based on the second attribute range and the second interpolated attribute value, to assign the second asset to the second candidate location during the third duration.

12. The method of claim 8, wherein the method further comprises:

receiving a second attribute range for a second asset;

simulating the virtual environment over a second duration;

recording, based on the simulating over the second duration, a second set of simulated attribute values, the second set of simulated attribute values including:

a third simulated attribute value for the first attribute at the first candidate location at a third time during the second duration; and a fourth simulated attribute value for the first attribute at the first candidate location at a fourth time during the second duration;

determining, based on the third simulated attribute value and the fourth simulated attribute value, a second simulated aggregate attribute value for the first attribute at the first candidate location over the second duration;

determining that the second simulated aggregate attribute value is out of the first attribute range and within the second attribute range;

determining, based on the detecting that the second simulated aggregate attribute value is out of the first attribute range, to not assign the first asset to the first candidate location; and determining, based on the detecting that the second simulated aggregate attribute value is within the second attribute range, to assign the second asset to the first candidate location.

13. The method of claim 8, wherein the first candidate location is a second asset.

14. The method of claim 8, wherein the state information comprises at least one of a time of day, a season, an in-environment event, or a status of any one or more of the plurality of assets in the virtual environment.

* * * * *